United States Patent [19]

Nomura

[11] 4,318,147
[45] Mar. 2, 1982

[54] MAGNETIC CARD RECORDING AND/OR REPRODUCING APPARATUS

[75] Inventor: Shigenori Nomura, Mitaka, Japan

[73] Assignee: Sony Corporation, Tokyo, Japan

[21] Appl. No.: 58,103

[22] Filed: Jul. 16, 1979

[30] Foreign Application Priority Data

Jul. 20, 1978 [JP] Japan .......................... 53/99953[U]

[51] Int. Cl.³ .......................... G11B 5/27; G11B 25/04
[52] U.S. Cl. ....................................... 360/119; 360/2;
360/88; 360/121; 360/123; 360/125
[58] Field of Search ............... 360/119, 121, 120, 123, 360/125, 2, 88

[56] References Cited

U.S. PATENT DOCUMENTS

| | | | |
|---|---|---|---|
| 3,499,977 | 3/1970 | DeLange | 360/123 |
| 3,526,725 | 9/1970 | Camras | 360/123 |
| 3,751,599 | 8/1973 | Ogawa et al. | 360/125 |
| 3,893,182 | 7/1975 | Schmidt | 360/2 |
| 4,085,429 | 4/1978 | Hasegawa | 360/119 |
| 4,126,885 | 11/1978 | Murata | 360/2 |
| 4,139,875 | 2/1979 | Tatara et al. | 360/2 |
| 4,151,564 | 4/1979 | Schreiber et al. | 360/2 |

*Primary Examiner*—Alfred H. Eddleman
*Attorney, Agent, or Firm*—Hill, Van Santen, Steadman, Chiara & Simpson

[57] ABSTRACT

In a magnetic card recording and/or reproducing apparatus, one edge of a magnetic card having a magnetic track parallel to the one edge is guided by a guiding member. The magnetic card is driven by a magnetic card drive member, and signals are recorded on, and reproduced from the magnetic card by a magnetic head. The magnetic head includes two head cores whose gaps are so arranged as to align with each other. Signals are recorded on the magnetic card by the two head cores, and the recorded signals are reproduced from the magnetic card by the one of the two head cores located at an upper position with respect to the guiding member.

9 Claims, 10 Drawing Figures

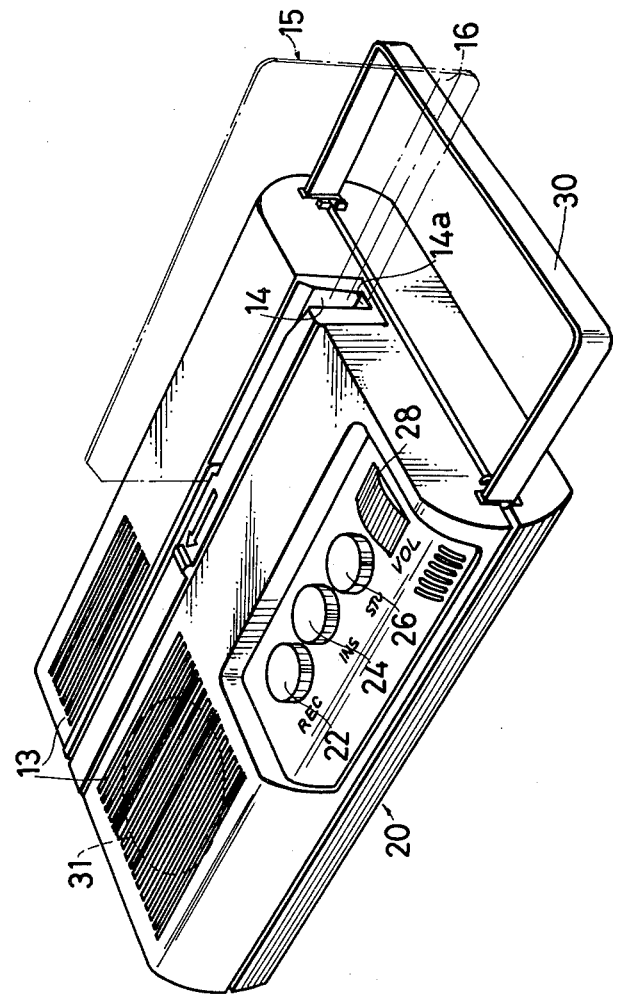

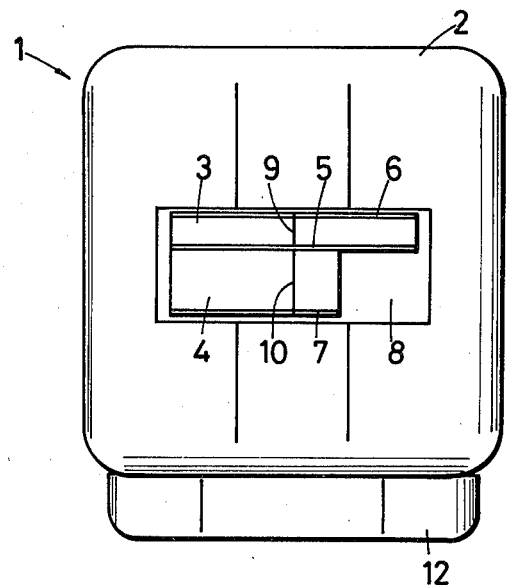
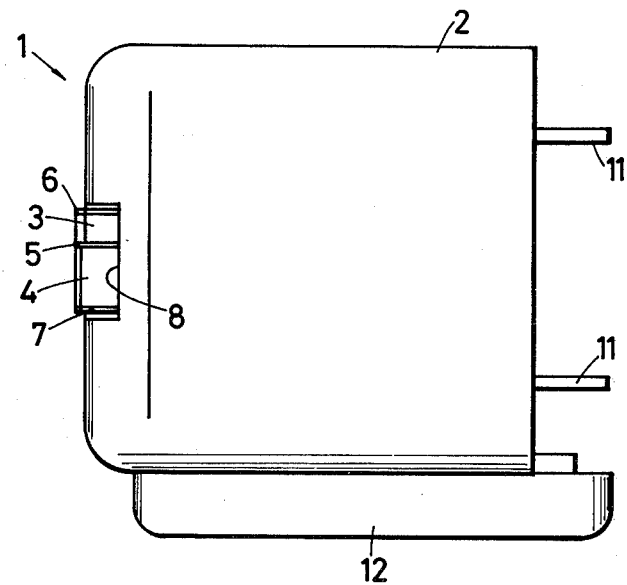

MAGNETIC CARD RECORDING AND/OR REPRODUCING APPARATUS

BACKGROUND OF THE INVENTION

1. Field of the Invention

This invention relates to a magnetic card recording and/or reproducing apparatus, and more particularly to a magnetic recording and/or reproducing apparatus in which the level variation of the reproduced signals due to the unsteady running of the magnetic card can be avoided.

2. Description of the Prior Art

A card recorder using a magnetic card is known as a teaching apparatus of English conversation. The magnetic card is made of cardboard. A magnetic tape on which English conversation is recorded, is attached to the magnetic card. Pictures and letters representing the recorded content are printed on the magnetic card. Such a magnetic card is called a "master card". For reproducing the audio signals from the magnetic card, the latter is inserted into a card running groove formed in the cabinet of the card recorder, and is driven to run in one predetermined direction.

A magnetic tape on which no audio signals are recorded may be attached to a magnetic card, which is called "slave card". Such a magnetic card may be used in the card recorder. Desired audio signals are recorded on the magnetic card by a user. The magnetic card is plain. Such pictures and letters as the user desires may be drawn on the recorded magnetic card.

In the card recorder, the magnetic card is pinched between a capstan formed as a rubber roller, and a magnetic head, to run in the card running groove. The position of the lower edge of the magnetic card is regulated by the bottom of the card running groove, while the upper edge of the magnetic card is quite free. Accordingly, the running magnetic card is sometimes slightly separated from the bottom of the card running groove, while pinched by the capstan and magnetic head, so that the running magnetic card moves slightly upward and downward.

For the above reason, a record track is not linearly formed on the magnetic card in the recording operation, and the record track cannot be accurately scanned by the gap of the magnetic head in the reproducing operation. Accordingly, the level of the reproduced signals varies in the reproducing operation. The thus reproduced signals are very disagreeable to hear.

SUMMARY OF THE INVENTION

Accordingly, it is an object of this invention to provide a magnetic card recording and/or reproducing apparatus which overcomes the above described defects of the conventional magnetic card recording and/or reproducing apparatus, and in which the record track is scanned by the reproducing gap of the magnetic head always within the width of the record track to avoid the level variation of the reproduced signal.

In accordance with an aspect of this invention, there is provided a magnetic card recording and/or reproducing apparatus in which one edge of a magnetic card having a magnetic track parallel to the one edge is guided by a guiding member. The magnetic card is driven by a magnetic card drive means, and signals are recorded on, and reproduced from the magnetic card by a magnetic head. The magnetic head includes two head cores whose gaps are so arranged as to align with each other. Signals are recorded on the magnetic card by the two head cores, and the recorded signals are reproduced from the magnetic card by the one of the two head cores located at an upper position with respect to the guiding member.

Various other objects, advantages and features of the present invention will become readily apparent from the ensuing detailed description, and the novel features will be particularly pointed out in the appended claims.

BRIEF DESCRIPTION OF THE DRAWINGS

FIG. 1 is a perspective view of a magnetic card recording and/or reproducing apparatus to which one embodiment of this invention will be applied;

FIG. 2 is an enlarged front view of a magnetic head according to one embodiment of this invention;

FIG. 3 is a side view of the magnetic head of FIG. 2;

DESCRIPTION OF THE PREFERRED EMBODIMENTS

Figure 4:
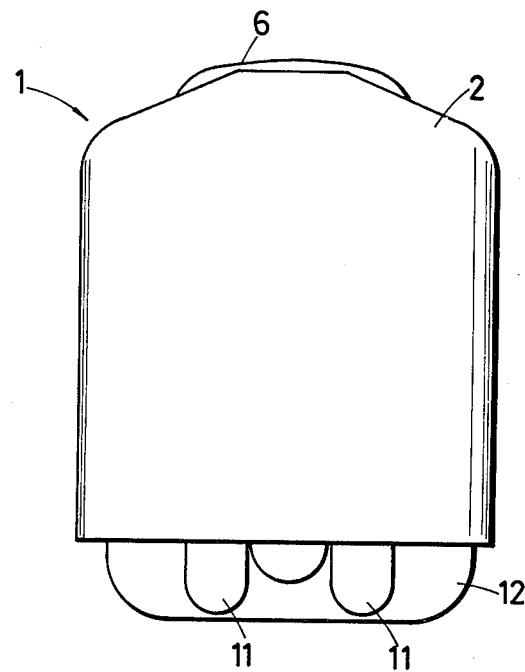
FIG. 4 is a plan view of the magnetic head of FIG. 2.
Figure 5:
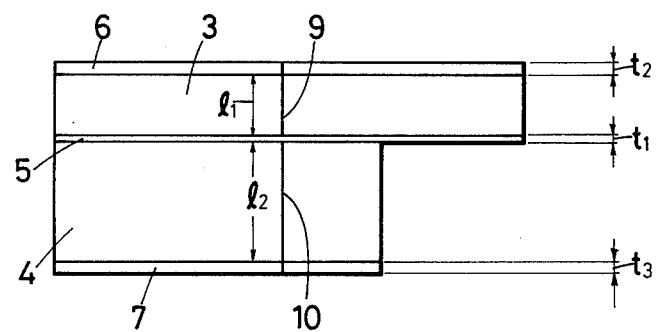
FIG. 5 is an enlarged front view of a part of the magnetic head of FIG. 2.

First, there will be described a magnetic card recording and/or reproducing apparatus embodying one preferred embodiment of this invention with reference to FIG. 1.

In a magnetic card recording and/or reproducing apparatus 20, operating push buttons 22, 24 and 26, and a switch-volume control knob 28 are located on an upper panel 13. A retractable handle 30 is slidably supported by the side wall of the apparatus 20. The apparatus 20 contains a loud-speaker 31. A card running groove 14 is formed in the upper panel 13. A magnetic card 15 shown by two-dot dash lines is inserted into the card running groove 14 in the recording operation or reproducing operation.

Next, there will be described a magnetic head according to one preferred embodiment of this invention with reference to FIG. 2 to FIG. 5.

Referring to FIG. 2 to FIG. 4, a first core 3 is mounted on a second core 4 in a casing 2 of a magnetic head 1. A dummy core 5 is interposed between the first and second cores 3 and 4. Further dummy cores 6 and 7 are arranged on the upper surface of the first core 3 and the lower surface of the second core 4, respectively. The cores 3 to 7 are fixed as one body in the casing 2 by molding with synthetic resin. A first gap 9 having the length of $l_1$ is made in the core 3. A second gap 10 having the length of $l_2$ is made in the core 4. The first and second gaps 9 and 10 are aligned with each other and separated by the dummy core 5. The length $l_2$ is so selected as to be about three times as large as the length $l_1$. For example, when the length $l_1$ is equal to 1 mm, the length $l_2$ is equal to 3 mm. The thicknesses $t_1$, $t_2$ and $t_3$ of the dummy cores 5, 6 and 7 are equal to, for example, 0.05 mm, 0.2 mm and 0.2 mm, respectively.

Four terminal pins 11 are fixed on the rear wall of the casing 2. A mount 12 is fixed on the bottom wall of the casing 2. The gap 9 is used for recording and reproducing. The gap 10 is used exclusively for recording. For that purpose, a reproducing coil is wound on the core 3, and a recording coil is wound on the cores 3 and 4.

Figure 6:
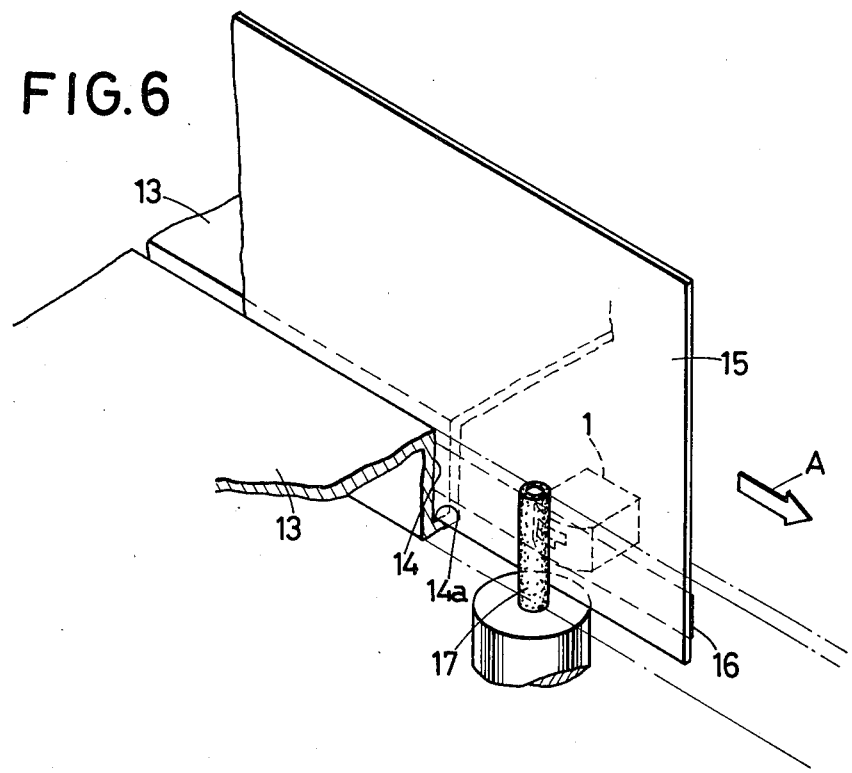
FIG. 6 is a fragmental perspective view of the magnetic card recording and/or reproducing apparatus of FIG. 1.

FIG. 6 shows the magnetic card mounted in the recording and/or reproducing apparatus. The magnetic card 15 is inserted into the card running groove 14 made in the upper panel 13, and it is pinched between the magnetic head 1 and a capstan 17 in the form of a rubber roller which face each other. A magnetic tape 16 is attached to the magnetic card 15, along the lower edge of the latter. The magnetic card 15 is driven to run in the direction shown by the arrow A, by the capstan 17 pressed to the magnetic head 1, for recording or reproducing audio signals.

Figure 7:
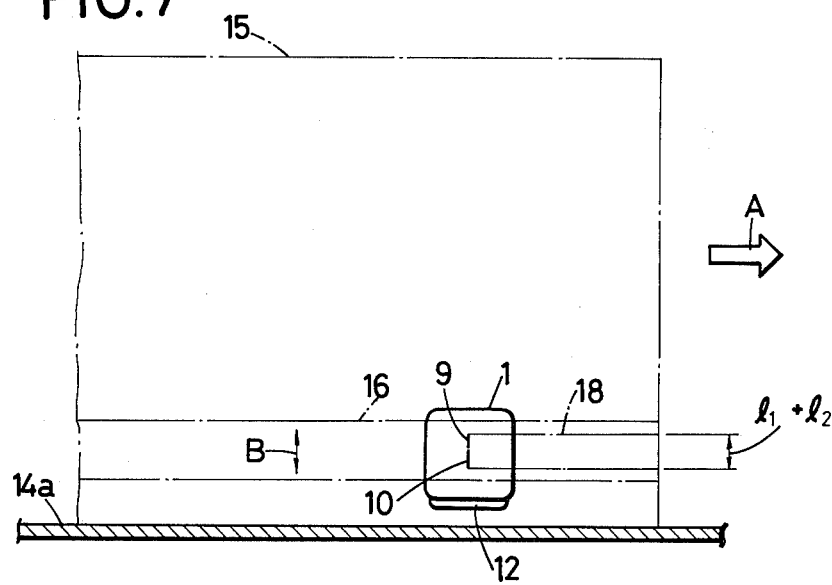
FIG. 7 is a front view for explaining the relationship between the magnetic card and the magnetic head of FIG. 2.

The recording or reproducing condition of the magnetic head 1 is shown in FIG. 7. While the position of the lower edge of the magnetic card 15 is regulated by a bottom surface 14a of the card running groove 14, the magnetic card 15 is driven in the direction shown by the arrow A, by the capstan 17 as pointed out above. In the recording mode, audio signals are recorded on the magnetic tape 16 the gaps 9 and 10 of the magnetic head 1. As the result, a record track 18 having the width of about $(l_1 + l_2)$ is formed on the magnetic tape 16.

When the lower edge of the magnetic card 15 is sometimes separated from its contact with the bottom surface 14a of the card running groove 14, namely when the magnetic card 15 sometimes moves upward and downward in the direction shown by the arrow B, some portions of the record track 18 are curved.

In the reproducing mode, the gap 9 for reproducing scans the record track 18 having the width of $(l_1+l_2)$. The gap 9 of the magnetic head 1 is maintained within the width of $(l_1+l_2)$ even in the case that the magnetic card 15 moves upward and downward in the direction shown by the arrow B in the reproducing mode, or when the portions of the record track 18 are curved. There is no possibility that the gap 9 entirely or partially deviates from the recorded track 18. Accordingly, the level of the reproduced signal is always constant.

Figure 8:
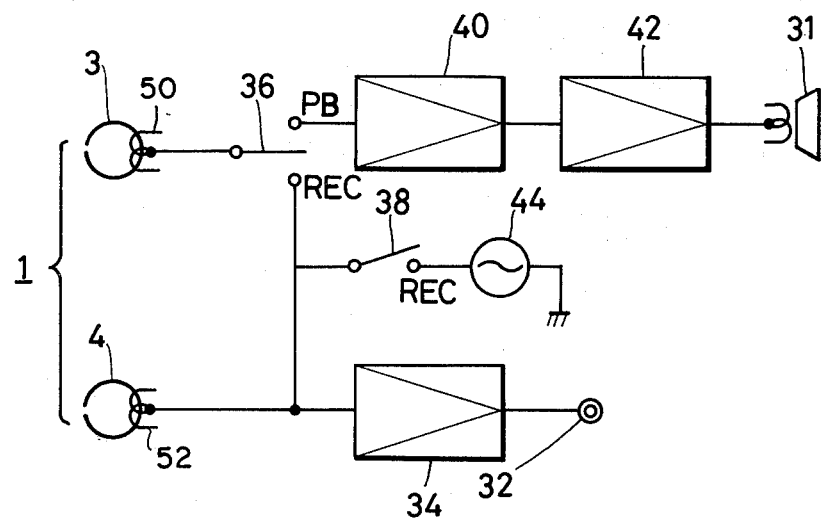
FIG. 8 is an electrical circuit diagram for the magnetic head according to the one embodiment.

FIG. 8 illustrates an electrical circuit for use in the above described apparatus.

In FIG. 8, recording signals are supplied to an input terminal 32 which is connected through a recording amplifier 34 to the lower core 4 of the magnetic head 1. Further, an output terminal of the recording amplifier 34 is connected through first and second switches 38 and 36 to the winding of upper core 3 of the magnetic head 1. The winding of lower core 4 of the magnetic head 1 is further connected through the first switch 38 to a bias oscillator 44. The winding of upper core 3 is connected through the second switch 36, a reproducing amplifier 40 and a power amplifier 42 to the loudspeaker 31.

In the recording mode, the first switch 38 is closed to a stationary record contact REC, and the second switch 36 is closed to a stationary record contact REC. The recording signals from the input terminal 32 are supplied through the recording amplifier 34 to the windings 50 and 52 of cores 3 and 4. Further, the output of the bias oscillator 44 is supplied to the windings 50 and 52 of cores 3 and 4.

In the reproducing mode, the first switch 38 is opened, and the second switch 36 is closed to another stationary contact PB (Play back). The reproduced signals from the core 3 are supplied through the second switch 36, the reproducing amplifier 40 and the power amplifier 42 to the loudspeaker 31.

Figure 9:
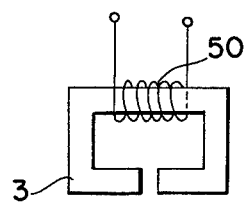
FIG. 9 illustrates the upper magnetic head core.
Figure 10:
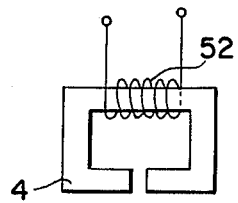
FIG. 10 illustrates the lower magnetic head core.

FIG. 9 illustrates upper core 3 upon which is wound the recording and reproducing winding 50. FIG. 10 illustrates lower core 4 and the recording winding 52.

Although the illustrative embodiment of the invention has been described in detail herein with reference to the accompanying drawings, it is to be understood that the invention is not limited to the precise embodiment, and that various changes and modifications can be effected therein by one skilled in the art without departing from the scope and spirit of the invention as defined in the appended claims.

I claim as my invention:

1. A magnetic card recording and/or reproducing apparatus having means for receiving one edge of a magnetic card and horizontally advancing the same, said magnetic card having a magnetic track parallel to said one edge thereof, drive means for advancing said magnetic card, a magnetic head having aligned upper and lower cores whose gaps are so arranged as to be aligned one above the other, the same signals being recorded on said card by said upper and lower head cores, and signals being reproduced from said magnetic card by said upper head core.

2. A magnetic card recording and/or reproducing apparatus according to claim 1, in which the length of the gap of the upper head core is smaller than that of the lower head core.

3. A magnetic card recording and/or reproducing apparatus according to claim 2, in which the length of the gap of said upper head core is substantially one third as large as that of the lower head core.

4. A magnetic card recording and/or reproducing apparatus according to claim 1, in which a pair of coils are respectively wound on said upper and lower head cores.

5. A magnetic card recording and/or reproducing apparatus according to claim 1, in which said guiding member is in the form of groove.

6. In a magnetic card recording and/or reproducing apparatus in which one edge of a magnetic card having a magnetic track parallel to said one edge is horizontally guided by a guiding member, said magnetic card being driven by a magnetic card drive means, and signals being recorded on and reproduced from said magnetic card by a magnetic head, the improvement in which said magnetic head includes aligned upper and lower head cores whose gaps are aligned with each other, the same signal being recorded on said magnetic card by said upper and lower head cores, and said recorded signals being reproduced from said magnetic card by said upper head core.

7. A magnetic head for recording and reproducing from a magnetic card having a horizontal magnetic track along one edge thereof, said head having aligned an upper magnetic core and a lower magnetic core separated from each other by a dummy core, each of said cores having a gap for recording the same sound track on said card, said gaps of each of said cores being aligned with each other, a pair of coils respectively wound on said upper and lower cores, and the length of said gap in said lower core being longer than the gap in said upper core.

8. A magnetic head for recording and reproducing from a magnetic card according to claim 7 in which the length of said gap in said lower core is several times longer than the length of the gap in said lower core.

9. A magnetic card recording and/or reproducing apparatus having means for receiving one edge of a magnetic card and horizontally advancing the same, said magnetic card having a magnetic track parallel to said one edge thereof, drive means for advancing said magnetic card, a magnetic head having a recording and reproducing core and a recording core whose gaps are aligned and said recording and reproducing core located above said recording core and aligned therewith, a first coil wound around said recording and reproducing core, a second coil wound around said reproducing core, switch means for selectively supplying recording signals from amplifier means to both of said cores during recording mode and supplying recorded signals on said magnetic track picked-up by said first coil to said amplifier means during a reproducing mode.

* * * * *